UNITED STATES PATENT OFFICE.

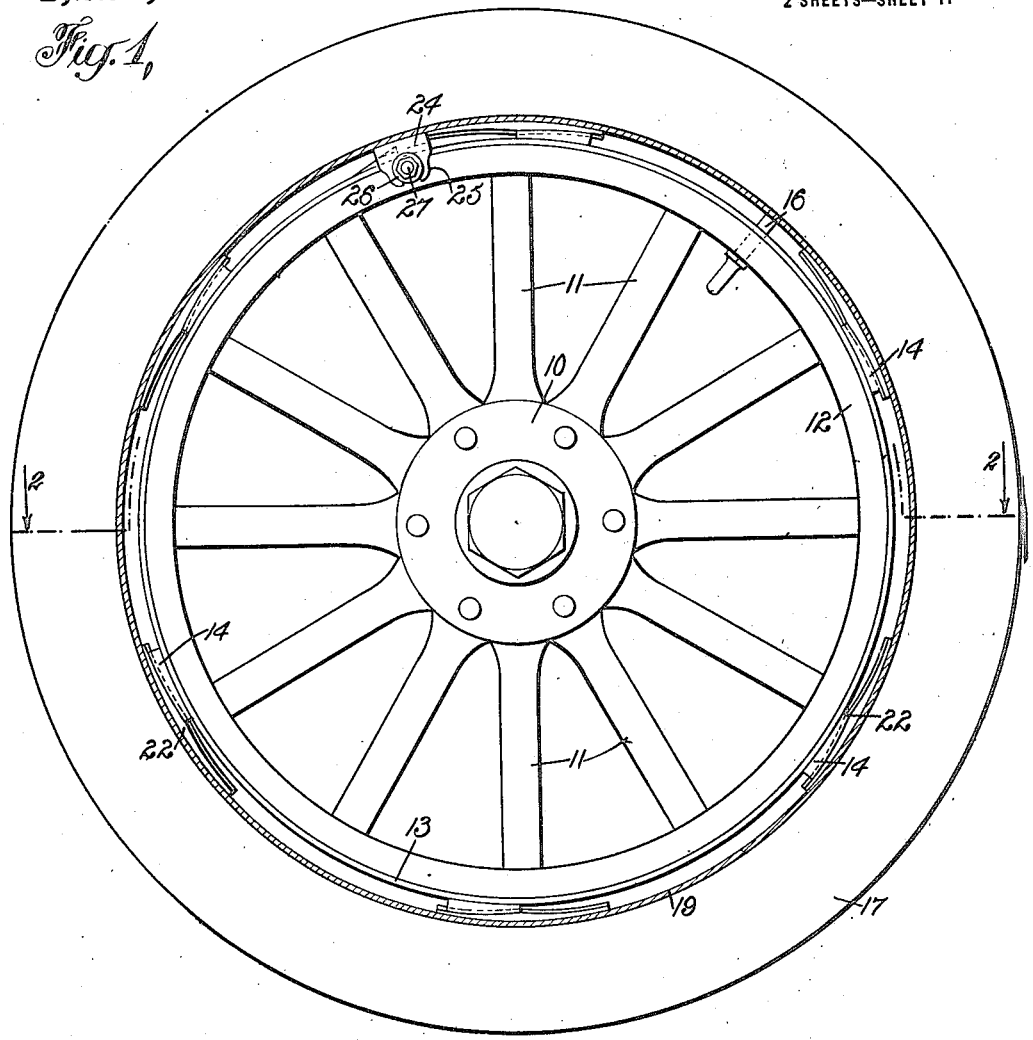
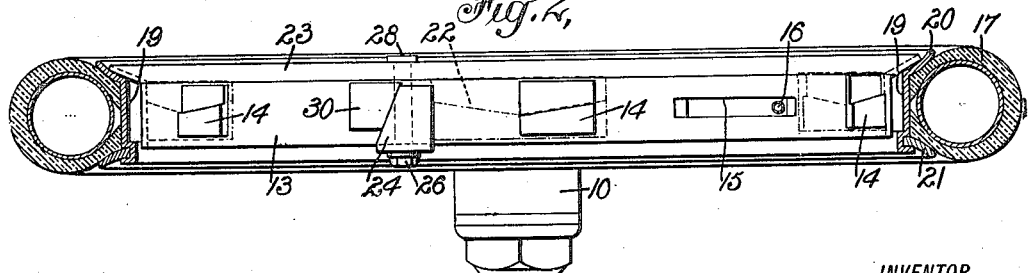

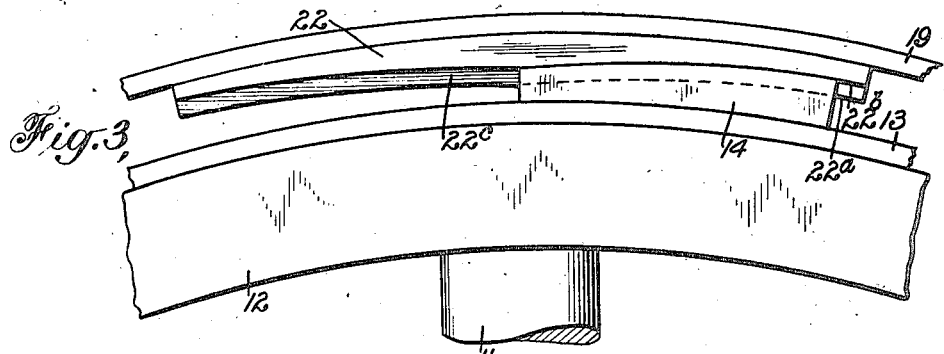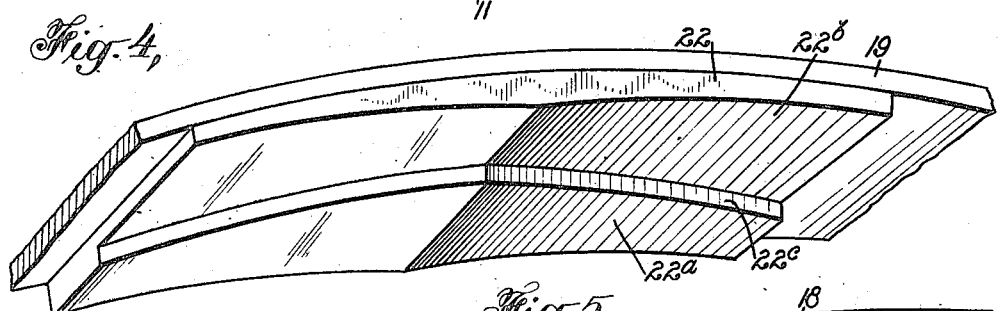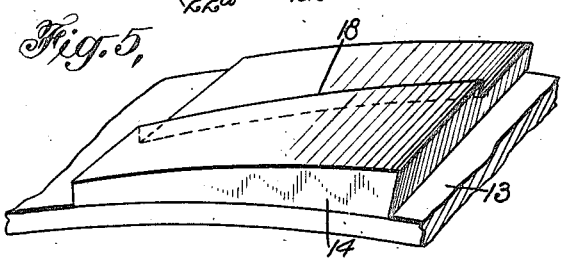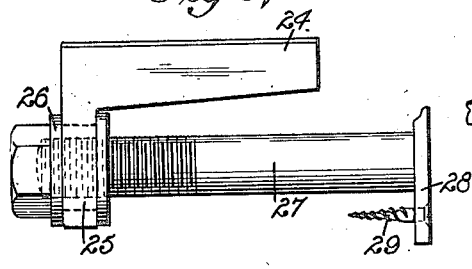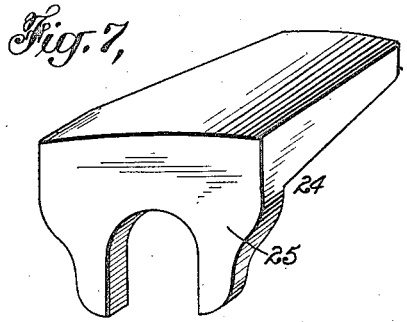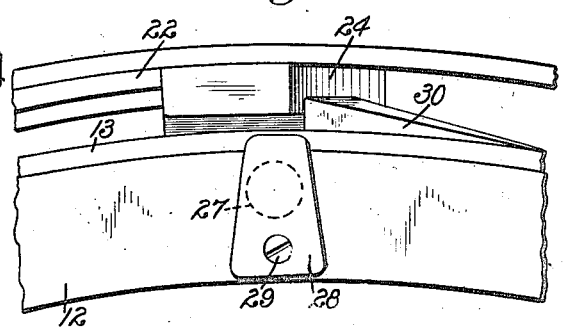

AXEL ALLGRUNN, OF DOVER, NEW JERSEY.

DEMOUNTABLE RIM.

1,225,557.   Specification of Letters Patent.   Patented May 8, 1917.

Application filed September 14, 1916. Serial No. 120,040.

*To all whom it may concern:*

Be it known that I, AXEL ALLGRUNN, a citizen of the United States, and a resident of Dover, in the county of Morris and State of New Jersey, have invented a new and Improved Demountable Rim, of which the following is a full, clear, and exact description.

This invention relates to vehicle wheels and has particular reference to demountable rims providing for the easy and rapid interchange of pneumatic or other tires carried by such rims.

Among the objects of the invention is to provide special rim construction for a wheel, said rim construction including a pair of coöperating and relatively movable rims, one of which is fixed to the felly and the other of which carries the tire and is removably connected to the stationary rim.

Another object of the invention is to provide a rim construction which is perfectly balanced and which possesses the maximum strength in proportion to the amount of material composing it.

Another object of the invention is to provide a demountable rim construction in which the relatively movable parts are all solid and rigid, and hence require no springs or other parts likely to become broken or out of order.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation showing the outside of a wheel or the side remote from the vehicle;

Fig. 2 is a horizontal section of the same on the line 2—2 of Fig. 1;

Fig. 3 is an enlarged side elevation of a detail of the rim construction showing the parts in the same position as in Fig. 1, the parts being in locked position;

Fig. 4 is a perspective view showing the inner surface of a portion of the outer or relatively movable rim section;

Fig. 5 is a perspective view of the outer surface of a portion of the stationary rim section;

Fig. 6 is an edge view of the clamping wedge and the jack bolt which coöperates therewith;

Fig. 7 is a perspective view of the wedge separated from the jack bolt; and

Fig. 8 is an inside elevation of the locking wedge portion of the improvement indicating the relation of the locking wedge to the abutment carried by the stationary rim section at the time force is to be applied to the wedge.

Referring now more particularly to the drawings, I show a wheel comprising a hub 10, spokes 11, felly 12, and a stationary rim 13 secured permanently to the outer surface of the felly. The rim 13 is solid or unbroken throughout its circumference and is fitted tightly and permanently to the felly in any suitable manner. Being solid it may be made relatively thin, light and yet be sufficiently strong for its purpose. Secured at equally spaced intervals upon and around the outer surface of the rim 13, are series of lugs 14, shown as six in number. The rim 13 also is provided with a slot 15 which registers with the opening through the felly for the accommodation of an air tube 16 for the pneumatic tire 17.

Each of the lugs 14 is provided with an offset 18 extending from one end to the other on a bias or diagonal constituting for the outer surface of the lug a flaring or wedge shaped projection, the wider end of which is located at the same end of the lug as the corresponding portions of all the other lugs. The wider end of the projection is thicker radially of the wheel than the narrower end. In other words, while the projection flares in its flat or broader dimension, it is also wedge shaped with the thicker portion at the same end as the wider portion. The inner surface of the lug conforms to the outer surface of the rim to which it is secured. The outer surface, however, of the lug is curved from a different center from that of the wheel. In other words, the outer surface of the lug is eccentric to the wheel and its rim 13. The reduced portion of the lug formed by the offset is curved similarly to the projection or is concentric therewith, and hence is thicker at one end than the other, the thicker end being at the same end of the lug as the thick end of the projection. Since the lugs 14 are equally spaced around the rim 13 and are all alike, the wheel thus far described is perfectly symmetrical and well balanced.

The removable rim section 19 called herein the demountable rim, except as hereinafter stated, may be of any suitable type or construction and adapted to carry or support any suitable type or construction of tire 17, usually, however, of a pneumatic nature. The rim 18 is shown comprising a rigid flange 20 and a detachable flange 21, but which *per se* constitute no part of my present improvement. I wish to observe, however, that the rim 19, like the rim 13, is solid or unbroken throughout its circumference, and hence is exceedingly strong and stiff in proportion to its weight. The inner surface of the rim 19 is provided with a series, shown as six in number, of wedges 22 spaced according to the spacing of the lugs 14 with which they coöperate. As shown best in Fig. 4, each wedge 22 comprises a projection 22$^a$ and a reduced portion 22$^b$, between which is a shoulder 22$^c$. The surfaces of the projection and depression of the wedge are parallel and eccentric to the center of the wheel. In other words, they are so formed as to be complemental to the two outer surfaces of the lugs 14. The part 22$^a$ of the wedge is tapered from one end to the other, the narrower end being arranged to coöperate with the wider end of the lug, while the shoulder 22$^c$ glides along and interlocks with the offset portion of a lug 14. The foregoing description of the wedges applies to the active ends thereof, although I show each of the wedges as of double ended form or of right and left construction adapting any demountable rim and its tire to be secured directly to either a right or left wheel, the lugs 14 of a right wheel being arranged oppositely from those of a left wheel.

In applying the demountable rim to a wheel, the wedge portions thereof are made to register with the spaces between lugs 14 of the wheel, while the demountable rim is being slipped approximately into position in a direction parallel to the axis of the wheel or until the fixed flange 20 engages the flange 23 of the fixed rim. The operator then by grasping the movable rim 19 or the tire carried thereby, may rotate the same in a clockwise direction, as illustrated in Fig. 1, so as to bring the wedges into gripping engagement with the fixed lugs 14 and approximating the final locked position thereof. He then introduces the binding wedge 24, shown in Figs. 6, 7, and 8, the same being tapered transversely of the wheel and having an inwardly projecting yoke 25 with which a shrouded nut 26 engages. The nut is threaded upon a jack bolt 27 extending transversely through the felly and has a head 28 secured along the inner edge of the felly by means of a screw 29 or its equivalent, whereby the bolt is held in fixed position with respect to the felly. By the application of a wrench to the nut 26, the operator may cause the nut to move positively along the bolt in either direction, causing the wedge 24 to move similarly. In the operation of locking the rim to the wheel the nut 26 will be turned in the usual manner in a clockwise direction, causing the binding wedge 24 to glide transversely of the wheel along a fixed abutment 30 carried by the rim 13 on the one side and one of the wedges 22 on the other side. Fig. 2 shows in dotted lines the relation of the wedge 22 to the binding wedge 24 and the other parts described. The whole operation is thus completed by the actuation of a single nut and said nut remains in fixed position, holding the binding wedge in such position as to positively lock and hold the demountable rim in running position. To remove the rim the nut is turned in the opposite direction which withdraws the binding wedge 24. Thus the demountable rim will be unlocked and set free for movement in a contra-clockwise direction for removal in a simple and easy manner.

I claim:

The combination with a relatively fixed rim of solid or unbroken nature throughout its circumference, a series of equally spaced lugs carried by the outer surface of said rim, each lug having two parallel offset surfaces eccentric to the rim, one of these surfaces pertaining to a projection of flared form, the wider portion thereof being at the same end as the thicker portion, of a relatively movable rim surrounding the fixed rim, a series of wedges carried by the inner surface of the movable rim and spaced similarly to the spacing of the lugs aforesaid, each wedge having a plurality of parallel surfaces eccentric to the wheel and having a shoulder extending circumferentially of the wheel between said two surfaces and adapted to interlock with the offset portion of an adjacent lug, an abutment secured to the fixed rim between two of the lugs thereof, a binding wedge movable transversely of the wheel between said abutment and one of the wedges of the movable rim, and screw operated means to cause said binding wedge to move positively in either direction, as and for the purposes set forth.

AXEL ALLGRUNN.

Witnesses:
HORACE W. ANDERSON,
WILLIAM F. BIRCH.